(12) United States Patent
Mehta et al.

(10) Patent No.: US 11,565,809 B2
(45) Date of Patent: Jan. 31, 2023

(54) UNMANNED AERIAL VEHICLE WITH CO-AXIAL REVERSIBLE ROTORS

(71) Applicant: IDEAFORGE TECHNOLOGY PVT. LTD., Navi Mumbai (IN)

(72) Inventors: Ankit Mehta, Navi Mumbai (IN); Ashish Bhat, Navi Mumbai (IN)

(73) Assignee: IDEAFORGE TECHNOLOGY PVT. LTD.

( * ) Notice: Subject to any disclaimer, the term of this patent is extended or adjusted under 35 U.S.C. 154(b) by 397 days.

(21) Appl. No.: 16/648,498

(22) PCT Filed: Aug. 30, 2018

(86) PCT No.: PCT/IB2018/056627
§ 371 (c)(1),
(2) Date: Mar. 18, 2020

(87) PCT Pub. No.: WO2019/058196
PCT Pub. Date: Mar. 28, 2019

(65) Prior Publication Data
US 2020/0223547 A1 Jul. 16, 2020

(30) Foreign Application Priority Data
Sep. 19, 2017 (IN) .............................. 201721033060

(51) Int. Cl.
*B64C 39/02* (2006.01)
*B64C 27/08* (2006.01)
(52) U.S. Cl.
CPC ............ *B64C 39/024* (2013.01); *B64C 27/08* (2013.01); *B60W 2520/14* (2013.01); *B64C 2201/024* (2013.01); *B64C 2201/027* (2013.01); *B64C 2201/108* (2013.01); *B64C 2201/14* (2013.01); *B64C 2201/162* (2013.01)

(58) Field of Classification Search
None
See application file for complete search history.

(56) References Cited

U.S. PATENT DOCUMENTS

| 9,567,075 | B2 | 2/2017 | Tighe | |
|---|---|---|---|---|
| 2016/0052626 | A1* | 2/2016 | Vander Mey | B64C 37/00 244/6 |
| 2016/0272313 | A1* | 9/2016 | Chan | B64C 11/48 |
| 2018/0354623 | A1* | 12/2018 | Bhat | B64C 39/024 |
| 2019/0256191 | A1* | 8/2019 | Suzuki | B64C 27/08 |

FOREIGN PATENT DOCUMENTS

| CN | 104176247 A | 12/2014 |
|---|---|---|
| WO | 2017098412 A1 | 6/2017 |

* cited by examiner

*Primary Examiner* — Lail A Kleinman

(57) ABSTRACT

The present disclosure pertains to a multi-rotor unmanned aerial vehicle (UAV). Aspects of the present disclosure provide a UAV that includes at least four arms, each configured with a co-axial pair of contra rotating propellers, wherein each propeller has capability of rotating reversibly with associated reversal of direction of thrust, and an autopilot control system that controls rotational direction and speed of the at least four co-axial pairs of propellers to maintain yaw stability, roll stability and pitch stability of the UAV, wherein in an event of failure of any one co-axial pair out of the at least four co-axial pairs of propellers, the autopilot control system reverses direction of rotation and thereby direction of thrust of at least one propeller of any functional pair.

8 Claims, 2 Drawing Sheets

UNMANNED AERIAL VEHICLE WITH CO-AXIAL REVERSIBLE ROTORS

TECHNICAL FIELD

The present disclosure relates generally to the field of Unmanned Aerial Vehicles (UAV), and more particularly to a UAV that stabilizes its flight characteristics in case of a rotor failure or malfunction of a rotor.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

A quadcopter, also called a quadrotor helicopter or quadrotor, is a multi-rotor Unmanned Aerial Vehicle (UAV) that is lifted and propelled by four rotors. Quadcopters are classified as rotorcraft, as opposed to fixed-wing aircraft, because their lift is generated by a set of rotors/propellers. Due to simplicity of design and wide range of applications, quadcopters are popular in both military and civilian domains.

A typical quadcopter generally consists of four arms, each arm extending between a fixed end connected to frame structure of the quadcopter and a free end operatively coupled with four vertically oriented rotors. Quadcopters are inherently unstable and rely on all four rotors for their control and maneuverability.

Evidently, in case of rotor failure or malfunction of a rotor of a quadcopter, flight stability of the quadcopter is compromised due to generation of surplus thrust from other rotors. Currently, solutions available to deal with rotor failure of a quadcopter include configuration of an emergency parachute with the quadcopter which assist in emergency landing of quadcopter. However, such a configuration is highly unreliable and employing an emergency parachute increases overall cost associated with the quadcopter.

There is therefore a need in the art to provide for a simple and efficient quadcopter that mitigates conditions such as rotor failure or malfunction of a rotor and balances surplus thrust and unequal torque generated by the other rotors during such conditions. Further, there exists a need to provide stability to roll, pitch and yaw of the quadcopter in case of rotor failure.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

A general object of the present disclosure is to provide an Unmanned Aerial Vehicle (UAV) with co-axial reversible rotors.

Another object of the present disclosure is to provide a UAV that mitigates conditions such as rotor failure or malfunction of a rotor.

Another object of the present disclosure is to provide a UAV that balances surplus thrust and unequal torque generated by other rotors of the UAV in case of failure of a rotor.

Another object of the present disclosure is to provide a UAV that stabilizes roll, pitch and yaw of the UAV in case of failure of a rotor.

These and other objects of the present invention will become readily apparent from the following detailed description taken in conjunction with the accompanying drawings.

SUMMARY

Aspects of the present disclosure relate to Unmanned Aerial Vehicles (UAV). In particular, the present disclosure provides UAV that stabilizes its flight characteristics in case of a rotor failure or malfunction of a rotor.

In an aspect, the present disclosure provides a UAV that includes at least four arms, each having a proximal end connected to body frame of the UAV and a distal end, wherein distal ends of the at least four arms define a polygon, at least four co-axial pairs of contra rotating propellers—one co-axial pair configured at distal end of each of the at least four arms, wherein each propeller has capability of rotating reversibly with associated reversal of direction of thrust, and an autopilot control system that controls rotational direction and speed of the at least four co-axial pairs of propellers to maintain yaw stability, roll stability and pitch stability of the UAV, wherein in an event of failure of any one co-axial pair out of the at least four co-axial pairs of propellers, the autopilot control system reverses direction of rotation and thereby direction of thrust of at least one propeller of any functional pair.

In an aspect, in the event of failure of any one co-axial pair, at least one propeller of the co-axial pair located opposite to centre of gravity of the failed pair reverses its direction of rotation to produce opposing thrust to that of other propeller of the same co-axial pair.

In an aspect, in the event of failure of any one co-axial pair, at least one propeller of each co-axial pair located closest to perpendicular direction of the failed pair produces additional thrust to stabilize lifting of the UAV.

In an aspect, in the event of failure of any one co-axial pair, collective speed of co-axial pair located closest to perpendicular direction of the failed pair is adjusted by the autopilot control system to stabilize rolling of the UAV. In an aspect, collective speed of co-axial pair located closest to perpendicular direction of the failed pair is adjusted to cancel out inadequate thrust and unequal torque generated by rotation of the at least four co-axial pairs of propellers.

In an aspect, in the event of failure of any one co-axial pair, rotational speed of co-axial pair located opposite to centre of gravity of the failed pair is adjusted by the autopilot control system to stabilize pitch of the UAV. In an aspect, rotational speed of the co-axial pair located opposite to centre of gravity of the failed pair is adjusted to reverse direction of rotation of each propeller of the same co-axial pair to produce opposing thrusts.

In an aspect, in the event of failure of any one co-axial pair, rotational speed of at least one propeller of the functional pairs is adjusted by the autopilot control system to control yaw of the UAV.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The present disclosure provides an Unmanned Aerial Vehicle (UAV) including at least two rods, and one or more center supporting plates holding the at least two rods to form a rigid structure, wherein the at least two rods are overlapped to form a crossed structure wherein ends of the at least two rods construe either a regular or an irregular polygon, and wherein a plurality of propellers are operatively coupled at the ends of the at least two rods to enable flight of the UAV.

Embodiments of the present disclosure explained herein relates to an Unmanned Aerial Vehicle (UAV) that includes at least four arms, each having a proximal end connected to body frame of the UAV and a distal end, wherein distal ends of the at least four arms define a polygon, at least four co-axial pairs of contra rotating propellers—one co-axial pair configured at distal end of each of the at least four arms, wherein each propeller has capability of rotating reversibly with associated reversal of direction of thrust, and an autopilot control system that controls rotational direction and speed of the at least four co-axial pairs of propellers to maintain yaw stability, roll stability and pitch stability of the UAV, wherein in an event of failure of any one co-axial pair out of the at least four co-axial pairs of propellers, the autopilot control system reverses direction of rotation and thereby direction of thrust of at least one propeller of any functional pair.

Figure 1:
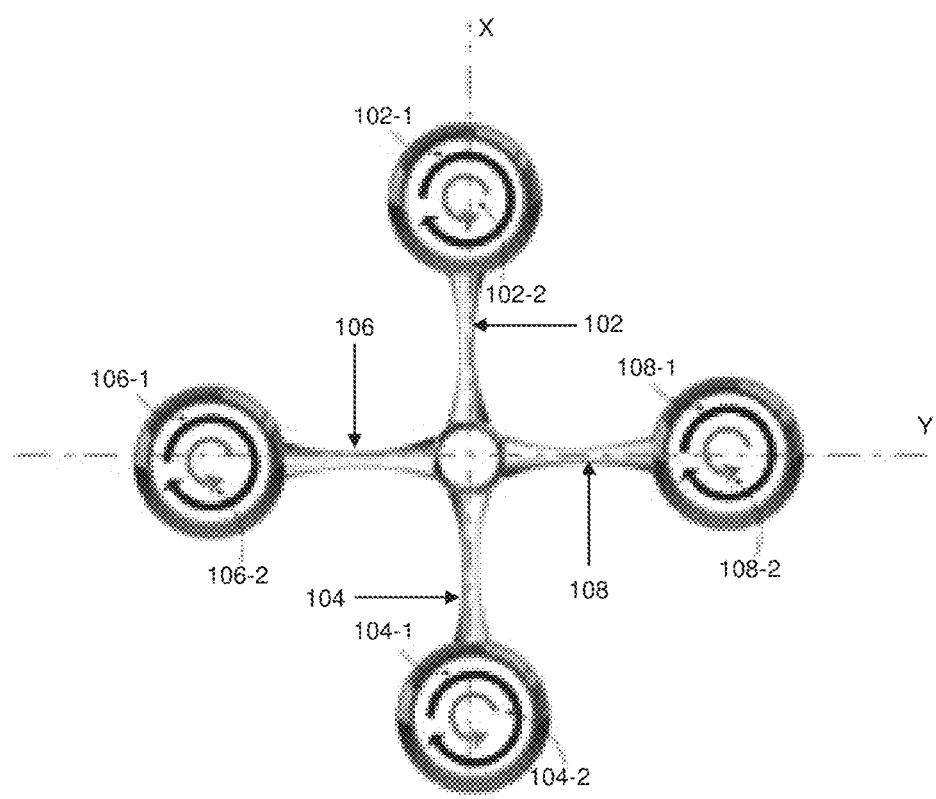
FIG. 1 illustrates an exemplary representation of an Unmanned Aerial Vehicle (UAV) configured with four co-axial pairs of contra rotating propellers/rotors in accordance to an embodiment of the present disclosure.

FIG. 1 illustrates an exemplary representation of a UAV configured with four co-axial pairs of contra rotating propellers/rotors in accordance to an embodiment of the present disclosure. In an aspect, the present disclosure provides a multi-rotor UAV that includes at least four arms, each arm having a distal end and a proximal end, wherein proximal end of each arm is connected to body frame of the UAV and distal end of each arm is operatively coupled with a co-axial pair of contra rotating rotors/propellers.

In an embodiment, the UAV can further include an autopilot control system (not shown) that controls rotational direction and speed of each propeller of the co-axial pair of contra rotating propellers to maintain yaw stability, lift stability and pitch stability of the UAV.

In an aspect, individual propellers of the co-axial pair of contra rotating propellers operatively coupled with each arm of the UAV has a capability of rotating reversibly with associated reversal of direction of thrust.

In an exemplary aspect of the present disclosure as illustrated in FIG. 1, the UAV can be a quadcopter. It would be appreciated that the UAV can be selected from a group of multi-rotor aircrafts such as hexacopter, octacopter and other vertical take-off and landing (VTOL) aircrafts.

In an exemplary embodiment, quadcopter can include four arms 102, 104, 106, and 108, each arm having a distal end and a proximal end, wherein proximal end of each arm is connected to body frame of the quadcopter and distal end of each arm can be operatively coupled with a co-axial pair of contra rotating propellers. For instance, arm 102 can be operatively coupled with a co-axial pair of contra rotating propellers that include two propellers 102-1 and 102-2. Arm 104 can be operatively coupled with a co-axial pair of contra rotating propellers that include two propellers 104-1 and 104-2. In a same way, arms 106 and 108 can be operatively coupled with respective co-axial pairs of contra rotating propellers. It would be appreciated that any number of propellers can be coupled with distal end of each arm of the UAV, and the number of propellers coupled with distal end of each arm is only exemplary and does not limit the scope of the resent disclosure.

In an embodiment, each propeller of the co-axial pair of contra rotating propellers can be reversibly driven by a suitable driving means such as an electric brushless motor, a brushless direct current (BLDC) motor, a permanent magnet synchronous motor (PMSM) and the like.

Figure 2:
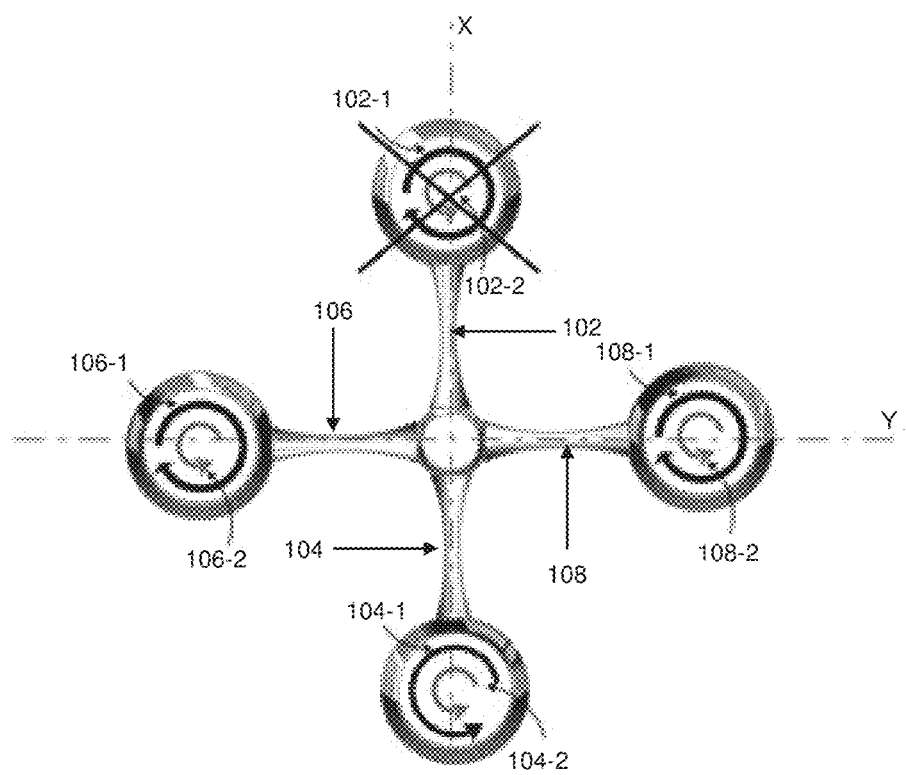
FIG. 2 illustrates an exemplary representation of a UAV configured with four co-axial pairs of contra rotating propellers in condition of rotor failure in accordance to an embodiment of the present disclosure.

FIG. 2 illustrates an exemplary representation of a UAV configured with four co-axial pairs of contra rotating propellers in condition of rotor failure in accordance to an embodiment of the present disclosure. In an aspect, the autopilot control system can control rotating direction and speed of each propeller of the co-axial pair of contra rotating propellers to maintain yaw stability, lift stability and pitch stability of the UAV. The autopilot control system can control operation of the plurality of rotors/propellers including their throttle based on operating condition of the UAV and its functional systems to maintain yaw stability, lift stability and tilt stability, wherein in an event of failure of any one co-axial pair of propellers, the autopilot control system controls operation of other plurality of rotors/propellers to maintain yaw stability, lift stability and tilt stability.

In an aspect, if any one arm of the UAV fails leading to failure of co-axial pair of contra rotating rotors configured with that arm completely, then, thrust and torque produced by these rotors goes down leading to tilting of the UAV due to surplus thrust and torque product by co-axial pair of contra rotating rotors configured with an arm located opposite to centre of gravity of the failed arm. In such a case, direction of any one rotor of the opposing co-axial pair present on the arm located opposite to centre of gravity of the failed arm is reversed and the thrust of the that rotor is also equalized with that of the other rotor of the same co-axial pair. Reversing the nominal direction of a reversible rotor produces thrust in the opposite direction. Thus, this reversing of any one rotor of the opposing co-axial pair produces a negative thrust opposite and equal to the thrust produced by other rotor of the same co-axial pair, which cancels out the surplus thrust and inadequate torque available at the other rotor of the same co-axial pair because of failure of a co-axial pair of propellers. In addition, further the thrust produced by the other rotors of the UAV coupled with each arms located closest to perpendicular direction of the failed arm are increased such that the UAV is stabilized in mid-air in terms of lift stability. As can be appreciated by a person skilled in the art that a failed arm denotes such an arm of the UAV that is coupled with a failed co-axial pair of propellers.

It is to be appreciated that in case of a multi-rotor aircraft comprising arms, ends of which together define an irregular polygon or a multi-rotor aircraft comprising odd number of arms, and when co-axial pair of propellers configured at an arm of such an aircraft fails, an arm located diagonally opposite or in perpendicular direction of the failed arm cannot be well defined. Hence, in such a scenario, an arm located opposite to centre of gravity of the failed arm can be construed as the arm located diagonally opposite to the failed arm, and an arm located closest to perpendicular direction of the failed arm can be construed as the arm located perpendicular to the failed arm.

In an exemplary embodiment of the present disclosure as illustrated in FIG. 2, in case of failure of co-axial pair of propellers configured at arm 102 (also referred to as failed arm 102 hereinafter), at least one propeller 104-1 of the co-axial pair of contra rotating propellers configured at distal end of an arm 104 located opposite to centre of gravity of the failed arm 102 reverses its direction of rotation to produce opposing thrust to that of the other propeller of the same co-axial pair 104-2.

In an exemplary embodiment of the present disclosure as illustrated in FIG. 2, in case of failure of co-axial pair of propellers configured at arm 102, at least one propeller 106-1/108-1 of the co-axial pair of contra rotating propellers configured at distal end of the arms 106/108 located closest to perpendicular direction of the failed arm 102 produces additional thrust to stabilize lifting of the quadcopter.

In another exemplary embodiment, in case of failure of co-axial pair of propellers configured at arm 102, collective speed of the co-axial pair of contra rotating propellers 106-1, 106-2, 108-1 and 108-2 configured at distal end of the arms 106 and 108 closest to perpendicular direction of the failed arm 102 is adjusted by the autopilot control system to stabilize rolling of the UAV (i.e., along x-axis), wherein collective speed of the co-axial pair of contra rotating propellers 106-1, 106-2, 108-1 and 108-2 configured at distal end of the arms 106 and 108 closest to perpendicular direction of the failed arm 102 is adjusted to cancel out inadequate thrust and unequal torque generated by rotation of the propellers of the quadcopter.

In another exemplary embodiment, in case of failure of co-axial pair of propellers configured at arm 102, rotational speed of the co-axial pair of contra rotating propellers 104-1 and 104-2 configured at distal end of the arm 104 located opposite to centre of gravity of the failed arm 102 is adjusted by the autopilot control system to stabilize pitch of the UAV (i.e., along y-axis). Rotational speed of the co-axial pair of contra rotating propellers 104-1 and 104-2 configured at distal end of the arm 104 diagonally located opposite to centre of gravity of the failed arm 102 is adjusted to reverse direction of rotation of each propeller 104-1/104-2 of the same co-axial pair to produce opposing thrusts, wherein rotational speed of the propellers is adjusted by the autopilot control system to control yaw of the quadcopter.

It would be appreciated that although the above explained embodiments are explained in terms of a quadcopter, the embodiments can further be configured to any multi-rotor UAV such as hexacopter, octacopter and other vertical take-off and landing (VTOL) aircrafts. Hence, scope of the present disclosure is not limited in any way whatsoever to a quadcopter and can include various multi-rotor UAVs.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides an Unmanned Aerial Vehicle (UAV) with co-axial reversible rotors.

The present disclosure provides a UAV that mitigates conditions such as rotor failure or malfunction of a rotor.

The present disclosure provides a UAV that balances surplus thrust and unequal torque generated by other rotors of the UAV in case of failure of a rotor.

The present disclosure provides a UAV that stabilizes roll, pitch and yaw of the UAV in case of failure of a rotor.

We claim:

1. An Unmanned Aerial Vehicle (UAV) comprising:
   at least four arms, each having a proximal end connected to body frame of the UAV and a distal end, wherein distal ends of the at least four arms define a polygon;
   at least four co-axial pairs of contra rotating propellers—one co-axial pair configured at distal end of each of the at least four arms, wherein each propeller has capability of rotating reversibly with associated reversal of direction of thrust; and
   an autopilot control system that controls rotational direction and speed of the at least four co-axial pairs of propellers to maintain yaw stability, roll stability and pitch stability of the UAV; and
   wherein in an event of failure of any one co-axial pair out of the at least four co-axial pairs of propellers, the autopilot control system reverses direction of rotation and thereby direction of thrust of at least one propeller of any functional pair.

2. The UAV of claim 1, wherein in the event of failure of any one co-axial pair, the autopilot control system reverses direction of rotation of at least one propeller of the co-axial pair located on an opposite side across the centre of gravity of the UAV to produce opposing thrust.

3. The UAV of claim 1, wherein in the event of failure of any one co-axial pair, at least one propeller of each co-axial pair located on the arm that extends in a direction closest to a direction perpendicular to the arm of the failed pair produces additional thrust to stabilize lifting of the UAV.

4. The UAV of claim 1, wherein in the event of failure of any one co-axial pair, collective speed of co-axial pair located on the arm that extends in a direction closest to a direction perpendicular to the arm of the failed pair is adjusted by the autopilot control system to stabilize rolling of the UAV.

5. The UAV of claim 4, wherein collective speed of co-axial pair located on the arm that extends in the direction closest to the direction perpendicular to the arm of the failed pair is adjusted to cancel out inadequate thrust and unequal torque generated by rotation of the at least four co-axial pairs of propellers.

6. The UAV of claim 1, wherein in the event of failure of any one co-axial pair, rotational speed of co-axial pair located on an opposite side across the centre of gravity of the UAV is adjusted by the autopilot control system to stabilize pitch of the UAV.

7. The UAV of claim 6, wherein rotational speed of the co-axial pair located on an opposite side across the centre of gravity of the UAV is adjusted to reverse direction of rotation of each propeller to produce opposing thrust.

8. The UAV of claim 1, wherein in the event of failure of any one co-axial pair, rotational speed of at least one propeller of the functional pairs is adjusted by the autopilot control system to control yaw of the UAV.

* * * * *